United States Patent
Bartlett

[15] 3,687,900
[45] Aug. 29, 1972

[54] HOMOPOLYMERS OF SUBSTITUTED GUANAMINES

[72] Inventor: Philip Lee Bartlett, Wilmington, Del.

[73] Assignee: E. I. du Pont de Nemours and Company, Wilmington, Del.

[22] Filed: July 1, 1970

[21] Appl. No.: 51,725

Related U.S. Application Data

[62] Division of Ser. No. 734,546, June 5, 1968, Pat. No. 3,536,710.

[52] U.S. Cl. .............................................260/67.6 C
[51] Int. Cl. ................................................C08g 9/28
[58] Field of Search..............260/67.6 C, 67.7, 249.9

[56] References Cited

UNITED STATES PATENTS

| | | | |
|---|---|---|---|
| 3,128,272 | 4/1964 | Wear et al. | 260/67.7 X |
| 3,162,633 | 12/1964 | Shaw | 260/249.9 |
| 3,171,861 | 3/1965 | Ahlbrecht | 260/67.7 X |
| 3,305,390 | 2/1967 | Shaw | 260/249.9 UX |
| 3,515,603 | 6/1970 | Brown et al. | 260/67.7 X |

Primary Examiner—Howard E. Schain
Attorney—John R. Powell

[57] ABSTRACT

Compounds of the formula

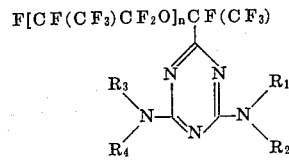

wherein $R_1$, $R_2$, $R_3$ and $R_4$ are each selected from the group consisting of hydrogen or methylol ($-CH_2OH$), and $n$ is an integer of 1 through 45, and polymers thereof.

2 Claims, No Drawings

HOMOPOLYMERS OF SUBSTITUTED GUANAMINES

CROSS-REFERENCE TO RELATED APPLICATION

This application is a division of application Ser. No. 734,546 filed June 5, 1968 now U.S. Pat. No. 3,536,710.

BACKGROUND OF THE INVENTION

1. Field of the Invention

This invention relates to novel perfluorooxo- or perfluoro-polyoxo-alkane substituted guanamines, the corresponding N-methylolguanamines and polymers of both.

2. Description of the Prior Art

Perfluoroalkylguanamines and perfluoroalkyl-methylolguanamines are known in the art (see, e.g., U.S. Pat. No. 3,162,633). Polymerization of the perfluoroalkyl-methylolguanamines on a textile substrate is also known (see, e.g., U.S. Pat. No. 3,162,633). However, these guanamines produce hard polymers on polymerization of their methylol derivatives, and when the compounds are polymerized in situ on textile substrates in concentrations sufficient to produce water spray resistance, the resulting polymer exhibits the undesirable properties of boardiness and harsh hand.

It is an object of this invention to provide compounds which overcome the undesirable properties of the art compounds.

SUMMARY OF THE INVENTION

The novel compositions of this invention comprise novel perfluorooxo- or perfluoropolyoxo-alkane substituted guanamines and their methylol derivatives which are represented by the structural formula

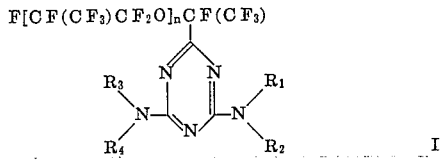

wherein $R_1$, $R_2$, $R_3$ and $R_4$ are each selected from the group consisting of hydrogen or methylol (—$CH_2OH$), and $n$ is an integer of 1 through 45. The compositions of formula I can be divided into two subgroups, —those in which $R_1$, $R_2$, $R_3$ and $R_4$ are hydrogen represented by the formula

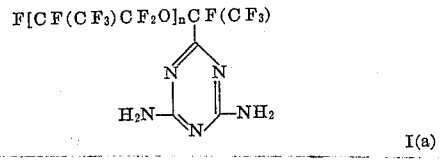

and those in which at least one of $R_1$–$R_4$ is methylol, represented by the formula

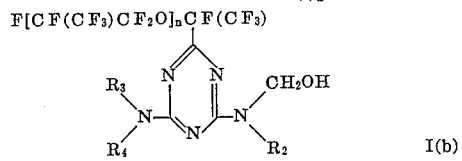

The novel compositions of this invention also include the following polymeric compositions:

A. homopolymers of the compounds of formula I($b$). The homopolymers resulting from the monomer of formula I($b$) in which $R_2$, $R_3$ and $R_4$ are hydrogen can be represented by recurring units of the structural formula

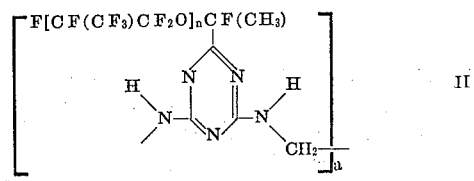

wherein $a$ is an integer of at least 100. Monomers of formula I($b$) which are more highly substituted with methylol groups yield three-dimensional polymeric structures.

B. copolymers of the compounds of formula I($b$) with melamine/formaldehyde or urea/formaldehyde compounds. In these copolymers the units represented by formula II are present in the copolymer chain.

C. copolymers of the compounds of formula I($a$) with epoxy resins.

D. copolymers of the compounds of formula I($a$) with di or poly-isocyanates. The recurring structural units of such copolymers can be represented by the formula

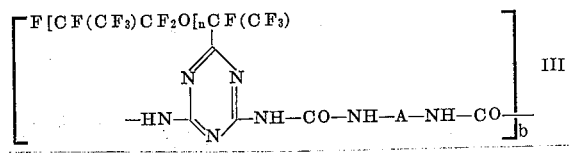

wherein $b$ is an integer of at least 50 and A is a divalent arylene groups.

DETAILED DESCRIPTION OF THE INVENTION

The compounds of formula I($a$) can be prepared from an ester of the formula $$F[CP(SF_3)CF_2O]_nCF(CF_3)COOR \qquad \text{IV}$$

wherein $n$ is as previously defined and R is lower alkyl and biguanide, $H_2NC(\,$ $NH)NHC(\,$ $NH)NH_2$, under alkaline conditions as described generally in Elderfield, "Heterocyclic Compounds," John Wiley and Sons, N.Y., N.Y., vol. 7, pp. 663-4 (1961) and Shapiro et al., J.Org.Chem. 25, 379-384 (1960). Briefly, the ester is added to a mixture of an acid salt of biguanide in the presence of an alcohol and an alkali metal alkoxide and the mixture refluxed. Evaporation of the filtrate gives the desired guanamine.

The ester reactants of formula IV are described in more detail in U.S. Pat. No. 3,250,808 which is incorporated herein for its description of the preparation of such esters and for its disclosure of representative such esters. It will be apparent that by reaction with biguanide, the products of this invention represented by formula I($a$) wherein $n$ is an integer of 1 through 45 are obtained. Preferably, however, n with respect to the compositions of this invention is an integer of 1 through 13.

The compounds of formula I(b) are prepared by reacting the compound of formula I(a) with formaldehyde as described in U.S. Pat. No. 3,162,633. Briefly, a compound of formula I(a) is reacted with formaldehyde at reflux temperatures in the presence of an inert solvent such as 1,4-dioxane in a ratio of formaldehyde to guanamine sufficient to produce the desired number of methylol groups in the resulting product.

Homolpolymers of the compounds of formula I(b) are obtained merely by heating said compounds at a temperature of between 100° C. and 200° C.

Similarly, copolymers of the compounds of formula I(bb) and methylol melamines or urea-formaldehydes and the copolymers of compounds of formula I(a) with epoxy resins or polyisocyanates are obtained by heating under the same conditions.

The perfluorooxo- and perfluoropolyoxoalkyl-guanamines of this invention possess markedly lower melting points than the art-known perfluoroalkyl-guanamines of U.S. Pat. No. 3,162,633, and are all viscous liquids or waxy solids at ambient temperatures. The polymers of this invention are unexpectedly softer than polymers prepared from the art guanamines. For example, the in situ polymerization of the tetramethylol-guanamines of the invention wherein n is three on textiles gives to the textile improved hand and abrasive resistance, and renders it unexpectedly more resistant to dry soiling. Further, it has been found that the copolymers of guanamines of formula I(a) with diisocyanates are surprisingly flexible. The epoxy copolymers of the invention are tough and crack resistant, not only on textiles but also in adhesive applications. Greater resistance to water in adhesive bonds is also present.

In addition, the compounds of formula I(a) are effective corrosion preventives and oil degradation inhibitors when added to perfluoropolyether lubricating oils.

The following examples are illustrative of the invention

EXAMPLE 1

Preparation of Perfluorooxo- and Perfluoropolyoxo-Substituted Guanamines of Structure I(a)

30.0 g. (0.2 mol.) of biguanide sulfate ($H_2NC($ $NH)NHC—(NH)NH_2 \cdot H_2SO_4$, K. Rackmann, Ann.Chem. 376 170 (1910)), 300 cc. abs.ethanol, and sodium methoxide (10.9 g., 0.202 mol.) were combined and refluxed for 6 hrs. $F[CF(CF_3)CF_2O]_2CF(CF_3)COOCH_3$ (105.0 g., 0.206 mol.) was added and reflux was continued for 12 hours.

Precipitated sodium sulfate was filtered and the filtrate was evaporated under vacuum to yield 104.5 g. of crude guanamine product. The residue was extracted for 12 hrs. with dry ether in a Soxhlet extractor. The ether solution was evaporated to yield 93.6 g. of purified product as a colorless waxy solid, in 83.4% yield based on biguanide sulfate. The product had the formula set forth as I(a) wherein n is 2.

Analysis:
Found:   %F: 57.3; %N: 12.3
Calc'd for $C_{11}H_4F_{17}N_5O_2$:   %F: 57.6; %N: 12.5

Guanamines of this invention wherein n is 1 and 5 were similarly prepared. Their analysis is as follows:

| n | Found F | Analysis N | Calc'd. F | N | Yield Based on Biguanide % |
|---|---|---|---|---|---|
| 1 | 52.4 | 17.4 | 52.9 | 17.7 | 91.1 |
| 5 | 62.3 | 6.6 | 62.8 | 6.6 | 60.8 |

Guanamines were also prepared from mixtures of higher molecular weight perfluoroether-acid esters. For example, a distillation fraction (about 100°–115 °C., 0.35 mm. Hg) of the acid fluorides of U.S. Pat. No. 3,250,808, provided, after conversion to the methyl esters and reaction with biguanide, a viscous liquid guanamine mixture of the structure set forth in I(a) in about 95 percent yield in which, by nitrogen analysis (3.9 percent), the average value of n was 9.4.

Similarly, a mixture of methyl esters of U.S. Pat. No. 3,250,808 of an average free acid molecular weight of 2400 (corresponding to $n \cong 13.5$) provided in about 93 percent yield a mixture of viscous liquid guanamines of formula I(a) whose nitrogen analysis (2.8 percent) corresponds to an average n-value of 13.7. Another methyl ester mixture of average free acid molecular weight 6300 (corresponding to $n \cong 37$) also provided a mixture of viscous liquid guanamines which analysis suggests have n-values from 37 to 45.

EXAMPLE 2

Preparation of Polymethylol Guanamines of Structure I(b)

A. Where n = 2 and each R is methylol

The guanamine of structure I(a) wherein n=2 (30.0 g., 0.0535 mol.) and 37 percent aqueous formaldehyde (20 g., 0.255 mol.) were combined in 1,4-dioxane (200 cc.) and refluxed 1 hr.

The tetramethylol product, a viscous liquid after evaporation of the solvent at 35° C. and 1 mm. Hg, weighed 33.6 g., corresponding to 92 percent yield based on the guanamine.

Analysis:
Found:   %F: 47.3; %N: 10.1
Calc'd. for $C_{15}H_{12}F_{17}N_5O_6$:   %F: 47.4; %N: 10.3

Similarly, tetramethylol derivatives of other guanamines of structure I(a) in which n is 1 and 5 were prepared and analysis gave the following results:

| n | Found %F | Analysis %N | Calc'd. %F | %N | Yield Based on Guanamine (%) |
|---|---|---|---|---|---|
| 1 | 40.6 | 13.6 | 40.6 | 13.6 | 94 |
| 5 | 56.0 | 5.9 | 56.4 | 5.9 | 94 |

B. Methylol Guanimines wherein n is an average of 9.43

Mixed guanamines prepared under example 1 in which the average n was 9.4 produced a mixture of more highly methylolated guanamines. According to nitrogen analysis (3.5 percent) the average degree of methylol substitution was 6.8. The yield was 99 percent.

C. Methylol Guanimines wherein n is an average of 13.5 and 36.3

Mixed guanamines in which average n=13.5 and 36.3 provided in 96 and 75 percent yields, respectively, polymethylolamines in which according to nitrogen analysis (2.7 percent and 1.1 percent), the average degree of methylol substitution was 4.3 and 4.0, respectively.

EXAMPLE 3

All the polymethylolguanamines of example 2 were readily polymerized to clear, colorless, solids, insoluble in the usual laboratory solvents, by heating for 15 min. in a 125° C. oven.

The polymers were tough and flexible. Flexibility was greatest in polymers in which n was at least about three and in mixtures in which $n$ was variable.

The guanamines of the invention also undergo copolymerization with methylol melamines and urea-formaldehyde on heating.

EXAMPLE 4

Curing of Epoxy Resins with Guanamines of Structure I(a)

All guanamines of structure I($a$) cure diepoxide resins. For example, the resin monomer,

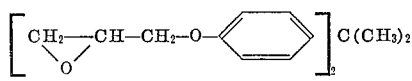

is thoroughly mixed with the guanamine, optimally in the ratio of one guanamine molecule to one monomer molecule. Curing is effected by heating to 150° for 1–2 hours. A tack-free polymer is produced.

The quality of aluminum to aluminum and steel (mild 1020 steel) to steel adhesion of conventional diethylenetriamine-cured epoxy cement was compared with the above diepoxide resin/guanamine polymer wherein n was 1 and 2. Curing was effected by 16 hr. heating to 150° C.

In all cases initial bonds were good. On flexing, however, the conventional adhesive was observed to be more brittle. One hour soaking in 65° C. water caused the conventionally cured bonds to fail on flexing whereas the guanamine-cured bonds, due to much increased water resistance, did not.

EXAMPLE 5

Curing of Di- or Poly-Isocyanates with Fluoroether-Substituted Guanamines of Structure I($a$)

On mixing, optimally in the molar proportion of one guanamine amino group to one isocyanate group, curing begins slowly at once and is complete after baking 2–3 hours at 100°–150° C.

The resin from the guanamine of structure I($a$) in which n=2 and toluene 2,4-diisocyanate was, when prepared by the above technique, tack-free and slightly flexible. The polymer is useful as a non-brittle adhesive.

EXAMPLE 6

A. Fabric Treatment

Separate weighed swatches of undyed automobile upholstery nylon tricot were dipped in solutions as follows:

a. 2.0 g. Structure I(b) wherein $n$ =4 and each R is methylol in 99 g. 1,1,2-trichloro-1,2,2-trifluoroethane b. 2.9 g. 6-perfluoroheptylguanamine tetramethylol in 97.1 g. ethanol The swatches were squeezed and air dried. Each were dipped in 1 wt. percent aqueous solution of citric acid (catalyst), air dried, and cured 15 min. in a 130° oven.

Uptake of treating agent was estimated by reweighing the cured swatches as ($a$) 2.3 and ($b$) 2.2 wt. percent, based on the weight of the fabric.

The swatch treated with mixture ($a$) was soft and had an attractive hand whereas the swatch treated with mixture ($b$) was stiff, i.e., boardy. The product tended to crock from the cloth producing the effect of dandruff.

B. Swatches treated with a compound of the invention (solution ($a$)) were comparable (70 versus 80) in water spray rating (Amer. Assoc. Textile Chemists and Colorists Standard Test Method 22-1964). Surprisingly, however, although the polymer of the invention is distinctly softer than is the polymer of the prior art, the swatches treated with the compound of the invention were found to be markedly more resistant to dry soiling.

C. In simultaneous tests, swatches treated with solution ($a$) or solution ($b$) and cured as described were subjected to the "Dry Soil Test" of U.S. Pat. No. 3,342,630.

The measured reflectances below of untreated and soiled swatches expressed as percent of the reflectance from a magnesium carbonate standard show clearly that fabric treated with the compound of the invention is markedly more resistant to dry soil than are identical samples of fabric treated with the compound of the prior art:

| Monomer | Reflectance (% of MgCO₃ std.) | |
| --- | --- | --- |
| | Orig. | Soiled |
| F[CF(CF₃)CF₂O]₄—CF(CF₃) triazine with (CH₂OH)₂N— substituents | 82.0 | 24.5 |
| C₇F₁₅ triazine with (CH₂OH)₂N— substituents | 82.5 | 18.0 |

D. A mixture of methylol derivatives of structure I($b$) wherein $n$ varied from 1 to 8 and each R is methylol was applied to 65 percent "Dacron" polyester/35 percent cotton fabric and to nylon fabric. Water spray ratings of 70 and 80, respectively, were found. Dry soil resistance was about the same as that observed in the above example.

The preceding representative Examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Homopolymers of the formula

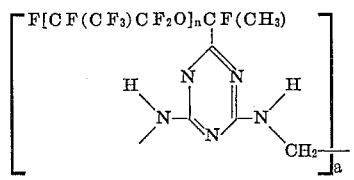

II wherein n is an integer of 1 through 45 and a is an integer of at least 100.

2. Homopolymers prepared by heating at a temperature of between 100° and 200° C. a compound of the formula

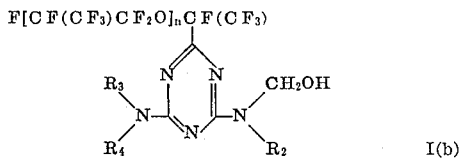

I(b)

wherein $R_2$, $R_3$ and $R_4$ can be the same or different and are hydrogen or methylol, and n is an integer of 1 through 45.

* * * * *

PO-1050
(5/69)

UNITED STATES PATENT OFFICE
CERTIFICATE OF CORRECTION

Patent No. 3,687,900　　　　　　　　Dated　8/29/72

Inventor(s)　Philip Lee Bartlett

It is certified that error appears in the above-identified patent and that said Letters Patent are hereby corrected as shown below:

Column 2, line 10, change the structure to

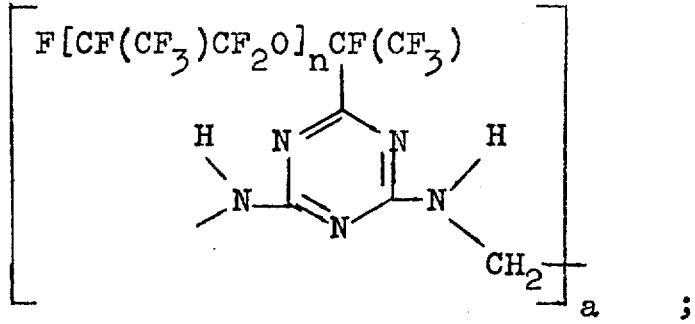

line 47, change formula IV to -- $F[CF(CF_3)CF_2O]_nCF(CF_3)COOR$ --; line 51, change the formula to
-- $H_2NC(=NH)NHC(=NH)NH_2$ --. Column 3, line 12, change "Homolpolymers" to -- Homopolymers --; line 16, change "I(bb)" to -- I(b) --; lines 49-50, change formula to
-- $H_2NC(=NH)NHC(=NH)NH_2 \cdot H_2SO_4$ --. Column 7 in formula II, change $H_3$ to $F_3$ and move the double bond in the upper portion of the ring from the right side to the left so that the formula reads

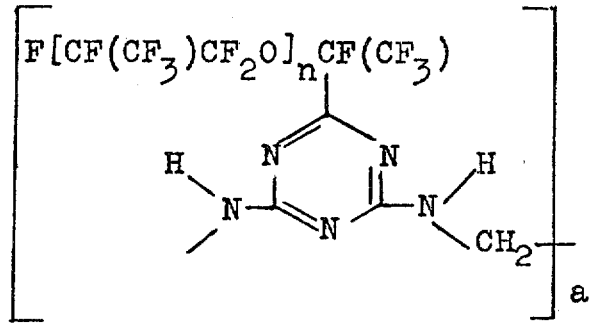

Signed and sealed this 22nd day of May 1973.

(SEAL)
Attest:

EDWARD M. FLETCHER, JR.
Attesting Officer

ROBERT GOTTSCHALK
Commissioner of Patents